(12) United States Patent
Armes et al.

(10) Patent No.: US 9,546,037 B1
(45) Date of Patent: Jan. 17, 2017

(54) MODULAR FOAM DISPENSING GUN

(71) Applicant: ICP Adhesives and Sealants, Inc., Norton, OH (US)

(72) Inventors: Kerry W. Armes, Norton, OH (US); Christopher Dolezal, Canton, OH (US); Karl W. Burkart, Akron, OH (US); James Paul Hunt, Akron, OH (US)

(73) Assignee: ICP Adhesives and Sealants, Inc., Norton, OH (US)

( * ) Notice: Subject to any disclaimer, the term of this patent is extended or adjusted under 35 U.S.C. 154(b) by 7 days.

(21) Appl. No.: 14/748,681

(22) Filed: Jun. 24, 2015

(51) Int. Cl.
| | | |
|---|---|---|
| *B05B 7/12* | (2006.01) | |
| *B65D 83/14* | (2006.01) | |
| *B65D 83/20* | (2006.01) | |
| *B65D 83/22* | (2006.01) | |
| *G01K 11/12* | (2006.01) | |
| *B05B 7/04* | (2006.01) | |
| *B05B 1/00* | (2006.01) | |

(52) U.S. Cl.
CPC ............ *B65D 83/752* (2013.01); *B05B 1/005* (2013.01); *B05B 7/04* (2013.01); *B05B 7/12* (2013.01); *B05B 7/1209* (2013.01); *B65D 83/202* (2013.01); *B65D 83/22* (2013.01); *G01K 11/12* (2013.01)

(58) Field of Classification Search
CPC ..... B65D 83/752; B65D 83/202; B65D 83/22; G01K 11/12; B05B 7/04; B05B 1/005; B05B 7/12; B05B 7/1209; B05B 9/01; B05B 1/185; B05B 15/065
USPC .................. 239/413, 414, 416.1, 417.5, 427, 428,239/432, 525, 600; 222/145.1, 145.5, 145.6
See application file for complete search history.

(56) References Cited

U.S. PATENT DOCUMENTS

| | | |
|---|---|---|
| 2,635,010 A | 4/1953 | Sanders et al. |
| 3,146,950 A | 9/1964 | Lancaster |
| 3,650,479 A | 3/1972 | Liedberg |
| 3,838,578 A | 10/1974 | Sakasegawa et al. |
| 5,242,115 A | 9/1993 | Brown |
| 5,462,204 A | 10/1995 | Finn et al. |
| 5,529,245 A | 6/1996 | Brown |
| 6,158,624 A | 12/2000 | Grigg et al. |
| 6,182,868 B1 | 2/2001 | Hurray et al. |
| 6,431,468 B1 | 8/2002 | Brown et al. |
| 6,837,398 B2 * | 1/2005 | Rueschhoff ............ B29B 7/7438 222/145.5 |
| 7,559,440 B2 * | 7/2009 | Rueschhoff ............ B05B 1/3066 239/414 |
| 8,177,451 B2 | 5/2012 | Park |
| 9,079,197 B2 * | 7/2015 | Bina ..................... B05B 7/0408 |
| 2005/0035220 A1 | 2/2005 | Brown |
| 2006/0192033 A1 | 8/2006 | Dansizen et al. |
| 2007/0095939 A1 | 5/2007 | Saunders et al. |
| 2008/0296398 A1 | 12/2008 | Hickman et al. |

(Continued)

OTHER PUBLICATIONS

Froth-Pak™ Ultra Premium Foam Insulation System bearing a copyright date of 2014 on the last page.

(Continued)

*Primary Examiner* — Steven J Ganey

(74) *Attorney, Agent, or Firm* — Hahn Loeser & Parks LLP

(57) ABSTRACT

A modular foam spray gun is illustrated in which a third hose is attached to the gun for the application of either a liquid or a gas, the spray gun having a transverse channel positioned at a rear of the housing of the gun for securely affixing the separable module to the housing of the spray gun.

23 Claims, 8 Drawing Sheets

(56) References Cited

U.S. PATENT DOCUMENTS

2009/0306674 A1    12/2009  Chandler
2010/0065130 A1     3/2010  Swab et al.
2014/0034756 A1*    2/2014  Gantenbein .......... B05B 7/0408
                                                        239/416.1

OTHER PUBLICATIONS

Froth-Pak™ Ultra Premium Foam Insulation Manual bearing an edition date of 2015 on the first page.

* cited by examiner

MODULAR FOAM DISPENSING GUN

TECHNICAL FIELD OF THE INVENTION

The invention described herein relates generally to a modular two-component spray gun with optional third stream channel.

BACKGROUND OF THE INVENTION

This invention is particularly suited for in-situ applications of liquid chemicals mixed and dispensed as a spray or a foam and more specifically, to in-situ application of polyurethane foam or froth. In-situ applications for polyurethane foam have continued to increase in recent years extending the application of polyurethane foam beyond its traditional uses in the packaging, insulation and molding fields. For example, polyurethane foam is being used with increasing frequency as a sealant in the building trades for sealing spaces between windows and door frames and the like and as an adhesive for gluing flooring, roof tiles, and the like.

Polyurethane foam for in-situ applications is typically supplied as a "one-component" froth foam or a "two-component" froth foam in portable containers hand carried and dispensed by the operator through either a valve or a gun. However, the chemical reactions producing the polyurethane froth foam in a "one-component" polyurethane foam is significantly different from the chemical reactions producing a polyurethane froth foam in a "two-component" polyurethane foam. Because the reactions are different, the dispensing of the chemicals for a two-component polyurethane foam involves different and additional concepts and concerns than those present in the dispensing apparatus for a "one-component" polyurethane froth foam.

A "one-component" foam generally means that both the resin and the isocyanate used in the foam formulation are supplied in a single pressurized container and dispensed from the container through a valve or a gun attached to the container. When the chemicals leave the valve, a reaction with moisture in the air produces a polyurethane froth or foam. Thus, the design concerns related to an apparatus for dispensing one-component polyurethane foam essentially concerns the operating characteristics of how the one-component polyurethane foam is throttled or metered from the pressurized container. Post drip is a major concern in such applications as well as the dispensing gun not clogging because of reaction of the one component formulation with air (moisture) within the gun. To address or at least partially address such problems, a needle valve seat is typically applied as close to the dispensing point by a metering rod arrangement which can be pulled back for cleaning. While metering can occur at the needle valve seat, the seat is primarily for shut-off to prevent post drip, and depending on gun dimensioning, metering may principally occur at the gun opening.

In contrast, a "two-component" froth foam means that one principal foam component is supplied in one pressurized container, typically the "A" container (i.e., polymeric isocyanate, fluorocarbons, etc.) while the other principal foam component is supplied in a second pressurized container, typically the "B" container (i.e., polyols, catalysts, flame retardants, fluorocarbons, etc.). In a two-component polyurethane foam, the "A" and "B" components form the foam or froth when they are mixed in the gun. Of course, chemical reactions with moisture in the air will also occur with a two-component polyurethane foam after dispensing, but the principal reaction forming the polyurethane foam occurs when the "A" and "B" components are mixed or contact one another in the dispensing gun and/or dispensing gun nozzle. The dispensing apparatus for a two-component polyurethane foam application has to thus address not only the metering design concerns present in a one-component dispensing apparatus, but also the mixing requirements of a two-component polyurethane foam.

Further, a "frothing" characteristic of the foam is enhanced by the pressurized gas employed, e.g., fluorocarbon (or similar) propellant component, which is present in the "A" and "B" components. This fluorocarbon component is a compressed gas which exits in its liquid state under pressure and changes to it gaseous state when the aerosol liquid is dispensed into a lower pressure ambient environment, such as when the liquid components exit the gun and enter the nozzle.

The foam or froth is formed in the disposable nozzle as that is the only location where the "A" and "B" components contact each other. Further, a "frothing" characteristic of the foam (foam assumes consistency resembling shaving cream) is enhanced by the fluorocarbon (or similar) component, which is present in the "A" and "B" components. This fluorocarbon component is a compressed gas which exits in its liquid state under pressure and changes to it gaseous state when the liquid is dispensed into a lower pressure ambient environment, such as when the liquid components exit the gun and enter the nozzle.

A still further characteristic distinguishing two-component from one-component gun designs resides in the clogging tendencies of two-component guns. Because the foam foaming reaction commences when the "A" and "B" components contact one another, it is clear that, once the gun is used, the static mixer will clog with polyurethane foam or froth formed within the mixer. In practice, the foam does not instantaneously form within the nozzle upon cessation of metering to the point where the nozzles have to be discarded. Some finite amount of time must elapse. This is a function of the formulation itself, the design of the static mixer and, all things being equal, the design of the nozzle. This clearly teaches that the synthesized foam begins to change from an aerosol as it enters the mixing chamber (the nozzle) to a foam having the consistency of shaving cream.

The dispensing gun of the present invention is particularly suited for use in two-component polyurethane foam "kits" typically sold to the building or construction trade. Typically, the kit contains two pressurized "A" and "B" cylinders of about 7.5 inches in diameter which are pressurized anywhere between 150-250 psi, a pair of hoses for connection to the cylinders and a dispensing gun, all of which are packaged in a container constructed to house and carry the components to the site where the foam is to be applied. When the chemicals in the "A" and "B" containers are depleted, the kit is sometimes discarded or the containers can be recycled. The dispensing gun may or may not be replaced. Since the dispensing gun is included in the kit, kit cost considerations dictate that the dispensing gun be relatively inexpensive. Typically, the dispensing gun is made from plastic with minimal usage of machined parts.

Therefore, the sequence of the reaction which is taught is that an aerosol (gas & liquid droplet mixture) of "A" and "B" reactants are formed upon entry from the hoses from the "A" and "B" cylinders, which upon contact begins the "frothing" process in the synthesis of a foam having the consistency of shaving cream.

With the above as background, it is not logical that an aerosol "froth" foam within a nozzle would be capable of providing a color change in the plastic nozzle. While the heat transfer characteristics of a viscous semi-solid to a containing solid wall are good, in that for most applications, the viscous semi-solid would be in contact with the walls of the container for a period of at least minutes during its flow through the nozzle of the container. By contrast, the heat transfer characteristics of an aerosol "froth" foam are not good. The "froth" would be in contact with the walls of the nozzle for a period of no longer than a second or so (and for most two-component spray systems using 150-250 psi pressure in the hoses would result in a residence time within the nozzle of the spray gun of approximately 85-100 milliseconds at a typical flow rate of 50 g/sec).

While polyurethane foam is well known, the formulation varies considerably depending on application. In particular, while the polyols and isocyanates are typically kept separate in the "B" and "A" containers, other chemicals in the formulation may be placed in either container with the result that the weight or viscosity of the liquids in each container varies as well as the ratios at which the "A" and "B" components are to be mixed. In dispensing gun applications which relate to this invention, the "A" and "B" formulations are such that the mixing ratios are generally kept equal so that the "A" and "B" containers are the same size. However, the weight, more importantly the viscosity, of the liquids in the containers invariably vary from one another. To adjust for viscosity variation between "A" and "B" chemical formulations, the "A" and "B" containers are charged (typically with an inert gas) at different pressures to achieve equal flow rates. The metering valves in a two-component gun, therefore, have to meter different liquids at different pressures at a precise ratio under varying flow rates. For this reason (among others), some dispensing guns have a design where each metering rod/valve is separately adjustable against a separate spring to compensate not only for ratio variations in different formulations but also viscosity variations between the components. The typical two-component dispensing gun in use today can be viewed as two separate one-component dispensing guns in a common housing discharging their components into a mixing chamber or nozzle. This practice, typically leads to operator errors. To counteract this adverse result, the ratio adjustment then has to be "hidden" within the gun, or the design has to be such that the ratio setting is "fixed" in the gun for specific formulations. The gun cost is increased in either event and "fixing" the ratio setting to a specific formulation prevents interchangeability of the dispensing gun.

Another element affecting the operation of a two-component gun is the design of the nozzle. The nozzle is typically a throw away item detachably mounted to the nose of the gun. Nozzle design is important for cross-over and metering considerations in that the nozzle directs the "A" and "B" components to a static mixer within the tip. For example, one gun completely divides the nozzle into two passages by a wall extending from the nozzle nose to the mixer. The wall lessens but does not eliminate the risk of cross-over since the higher pressurized component must travel into the mixer and back to the lower pressure metering valve.

A still further characteristic distinguishing two-component from one-component gun designs resides in the clogging tendencies of two-component guns. Because the foam foaming reaction commences when the "A" and "B" components contact one another, it is clear that, once the gun is used, the static mixer will clog with polyurethane foam or froth formed within the mixer. This is why the nozzles, which contain the static mixer, are designed as throw away items. In practice, the foam does not instantaneously form within the nozzle upon cessation of metering to the point where the nozzles have to be discarded. Some time must elapse. This is a function of the formulation itself, the design of the static mixer and, all things being equal, the design of the nozzle.

The dispensing gun of the present invention is particularly suited for use in two-component polyurethane foam "kits" typically sold to the building or construction trade. Typically, the kit contains two pressurized "A" and "B" cylinders (150-250 psi), a pair of hoses for connection to the cylinders and a dispensing gun, all of which are packaged in a container constructed to house and carry the components to the site where the foam is to be applied. When the chemicals in the "A" and "B" containers are depleted, the kit is sometimes discarded or the containers can be recycled. The dispensing gun may or may not be replaced. Since the dispensing gun is included in the kit, kit cost considerations dictate that the dispensing gun be relatively inexpensive. Typically, the dispensing gun is made from plastic with minimal usage of machined parts.

The Prior Art dispensing guns are typically "airless" and do not contain provisions for cleaning the gun. That is, a number of dispensing or metering guns or apparatus, particularly those used in high volume foam applications, are equipped or provided with a means or mechanism to introduce air or a solvent for cleaning or clearing the passages in the gun. The third optional channel of the present application can be used for dispensing a solvent or other compressed gas.

Within each type of dispensing gun (e.g., one-component dispensing gun, two-component dispensing gun), a metering rod is utilized. The metering rod is a primary shutoff within the dispensing gun that meters or controls dispensing of material. The metering rod is often referred to as a needle or a pin and engages a female type receiver to meter or shutoff flow of chemical (e.g., material, component "A," component "B," etc.). In one-component dispensing guns, a single metering rod is included within a dispensing passage. In two-component dispensing guns, a metering rod is included within each dispensing passage associated with component (e.g., material). In an embodiment, two-component dispensing gun includes first dispensing passage and respective metering rod and second dispensing passage and respective metering rod. Upon use of a trigger, metering rod(s) allow material to be dispensed.

Fabrication of metering rods for dispensing guns include various challenges to produce an efficient dispensing gun at a reasonable price point. Typically, metering rods are fabricated incorporating brass, copper, and other materials (e.g., metallic, non-metallic, etc.). Yet, such materials have increased in cost and, in turn, increased cost of manufacturing dispensing guns. Furthermore, dispensing gun requires a secure mating between receiver and metering rod in order to prevent inconsistent metering (e.g., non-uniform dispensing of material, components, or chemical) and incomplete shut off (in a closed position). Inaccuracy between mating surfaces (e.g., receiver and metering rod) is typically overcome by forcing two elements together during initial assembly and allowing the more malleable of the two elements to take set. This technique is referred to as presetting and typically requires lengthy hold time which limits manufacturing of dispensing guns. Overall, presetting increases the possibility of enabling two mating surfaces to have secure connection (e.g., mating) to avoid leakage and/or non-uniform dispensing but adds to the manufacturing time.

Additionally, metallic metering rods are often fabricated with turning or grinding techniques. In particular, during creation of typical metallic metering rod(s), radial micro grooves are present due to such turning or grinding technique. With repeated use over duration of time, these micro grooves cause wear to the more malleable mating surface. In general, micro grooves grind or file away at the mating surface which can cause leakage of chemical/material at the mating surface.

While two-component dispensing guns discussed above function in a commercially acceptable manner, it is becoming increasingly clear as the number of in-situ applications for polyurethane foam increase, that the range or the ability of the dispensing gun to function for all such applications has to be improved. As a general example, metering rods that meter amount of dispensed material need to be fabricated in a manner that prevent uneven dispensing of materials as well as prevent incomplete shutoff.

Further limitations and disadvantages of conventional, traditional, and proposed approaches will become apparent to one of skill in the art, through comparison of such systems and methods with certain embodiments the claimed invention as set forth in the remainder of the present application with reference to the drawings.

SUMMARY OF THE INVENTION

In one embodiment of the invention, a modular foam spray gun is described in which a third input hose (when present) is provided for the spray gun in communication with the removable nozzle for dispensing a liquid or a compressed gas. The gun will have a pivotable trigger with safety lock, for controlling dispensing of the polyol and diisocyanate in the pair of input hoses, and the gun will have a separate control mechanism for controlling dispensing of a liquid or gas from the third input hose.

The modular foam spray gun comprises: a housing having at least a pair of female housing receptacles for receiving at least a pair of mating male housing protrusions extending from an insertable and detachable module; the housing having a front and a rear side and an upper and lower surface; the housing further having a raised transverse hollow channel toward a rear upper surface of the housing; the separable module having at least a pair of female module receptacles for receiving at least a pair of input hoses, each input hose for feeding one of at least one polyol and at least one diisocyanate under pressure of a propellant, each of the input hoses having at least one circumferentially raised rib and at least one adjacent circumferentially disposed slot at one end of each input hose; the separable module having two pairs of opposed apertures on each side of the module; one first pair of apertures aligned with the transverse rear channel; a first pin inserted into the first pair of apertures and transverse rear channel; one second pair of apertures aligned to tangentially contact the circumferentially disposed slot of each input hose; a second pin inserted into the second pair of apertures, the second pin tangentially contacting the circumferential slot on each input hose; a removable nozzle affixed to the front of the housing; and at least a first pivotable trigger for controlling dispensing of said at least one polyol and the at least one diisocyanate in the pair of input hoses, the trigger adjacent a handle.

In one aspect of the invention, the housing of the foam spray gun will further include a third female receptacle for receiving a third input hose for dispensing a liquid or a gas, the third female receptacle positioned above the pair input hoses for the at least one polyol and at least one diisocyanate.

The third input hose when present, will have at least one circumferentially raised rib and at least one adjacent circumferentially disposed slot at one end of the third input hose, and the housing further having a third pair of opposed apertures aligned to tangentially contact the circumferentially disposed slot of the third input hose; and a third pin inserted into the third pair of apertures, the third pin tangentially contacting the circumferential slot of the third input hose.

In another aspect of the invention, the foam spray gun will have: a second pivotable safety lock biased in a locked position, the second pivotable safety lock extending forward from a front face of the first pivotable trigger for controlling dispensing of the at least one polyol and the at least one diisocyanate. When present, the foam spray gun will have a third pivotable trigger forward of the first pivotable trigger for controlling dispensing of the liquid or gas from the third input hose.

In still another aspect of the invention, the foam spray gun will have a removable nozzle which is temperature sensitive changing from a first color to a second color upon a temperature change within the nozzle. Alternatively, the removable nozzle may have a temperature sensitive tape positioned thereupon the pressure sensitive tape being temperature sensitive changing from a first color to a second color upon a temperature change within the nozzle. It is also possible that at least one of the pair of input hoses has a temperature sensitive tape positioned thereupon, the pressure sensitive tape being temperature sensitive changing from a first color to a second color upon a temperature change within the hose.

The nozzle is typically affixed to the front of the housing by a twisting or rotational movement about a longitudinal axis mechanism, although other modes of attachment are within the scope of the invention.

In yet another aspect of the invention, the foam spray gun will include a high/low or on/off pivotable control within the separable module, the control within a flow path within the gun and post ingress of the at least one polyol and the at least one diisocyanate and independent of a position of the first trigger.

In an alternative embodiment of the invention, the foam spray gun will comprise: a housing having at least a pair of female housing receptacles for receiving at least a pair of mating male housing protrusions extending from an insertable and detachable module; the housing having a front and a rear side and an upper and lower surface; the housing further having a raised transverse hollow channel toward a rear upper surface of the housing; the separable module having at least a pair of female module receptacles for receiving at least a pair of input hoses, each input hose for feeding one of at least one polyol and at least one diisocyanate under pressure of a propellant, each of the input hoses having at least one circumferentially raised rib and at least one adjacent circumferentially disposed slot at one end of each input hose; the separable module having two pairs of opposed apertures on each side of the module; one first pair of apertures aligned with the transverse rear channel; a first pin inserted into the first pair of apertures and transverse rear channel; one second pair of apertures aligned to tangentially contact the circumferentially disposed slot of each input hose; a second pin inserted into the second pair of apertures, the second pin tangentially contacting the circumferential slot on each input hose; a removable nozzle affixed to the front of the housing; and a first pivotable trigger for controlling dispensing of the at least one polyol and the at least one diisocyanate in the pair of input hoses, the trigger adjacent a handle; a second pivotable safety lock trigger biased in a locked position, the second pivotable safety lock trigger extending forward from a front face of the first pivotable trigger for controlling dispensing of the at least one polyol and the at least one diisocyanate; a high/low pivotable control within the separable module, the control within a flow path within the separable module and post ingress of the at least one polyol and the at least one diisocyanate and independent of a position of the first trigger.

In the above embodiment, the housing may further comprise a third female receptacle for receiving a third input hose for dispensing a liquid or a gas and positioned above the pair input hoses for the at least one polyol and at least one diisocyanate. The third input hose will have at least one circumferentially raised rib and at least one adjacent circumferentially disposed slot at one end of the third input hose, the housing having a third pair of opposed apertures aligned to tangentially contact the circumferentially disposed slot of the third input hose; and a third pin inserted into the third pair of apertures, the third pin tangentially contacting the circumferential slot of the third input hose.

This embodiment will further comprise a third pivotable trigger forward of the first pivotable trigger for controlling dispensing of the liquid or gas from the third input hose.

As mentioned previously, the removable nozzle is temperature sensitive changing from a first color to a second color upon a temperature change within the nozzle. Alternatively, a temperature sensitive tape may be positioned on the nozzle, the pressure sensitive tape being temperature sensitive changing from a first color to a second color upon a temperature change within the nozzle. In another aspect, at least one of the pair of hoses has a temperature sensitive tape positioned thereupon, the pressure sensitive tape being temperature sensitive changing from a first color to a second color upon a temperature change within the hose. In yet another aspect, at least one hose leading from the cylinder to the spray gun changes from a first color to a second color indicative of the temperature of the chemicals resident within the hose.

In yet another aspect of the invention, a foam spray gun is described which comprises: a housing having at least a pair of female housing receptacles for receiving at least a pair of mating male housing protrusions extending from an insertable and detachable module; the housing having a front and a rear side and an upper and lower surface; the housing further having a raised transverse hollow channel toward a rear upper surface of the housing; the separable module having at least a pair of female module receptacles for receiving at least a pair of upwardly canted input hoses, each input hose for feeding one of at least one polyol and at least one diisocyanate under pressure of a propellant, each of the input hoses having at least one circumferentially raised rib and at least one adjacent circumferentially disposed slot at one end of each input hose; the separable module having two pairs of opposed apertures on each side of the module; one first pair of apertures aligned with the transverse rear channel; a first pin inserted into the first pair of apertures and transverse rear channel; one second pair of apertures aligned to tangentially contact the circumferentially disposed slot of each input hose; a second pin inserted into the second pair of apertures, the second pin tangentially contacting the circumferential slot on each input hose; a pressurized gas propellant for the at least one polyol and the at least one diisocyanate; a temperature displaying removable nozzle affixable to a front of the housing, the nozzle changing from a first color to a second color upon a temperature change within the nozzle; the removable nozzle comprising a static mixer for mixing an aerosol of the at least one polyol and the at least one diisocyanate; an upwardly canted third input hose in communication with the removable nozzle for dispensing a liquid or a gas and positioned above the pair of upwardly canted input hoses for the at least one polyol and at least one diisocyanate; a first pivotable trigger for controlling dispensing of the at least one polyol and the at least one diisocyanate in the pair of input hoses, the trigger adjacent a handle; a second pivotable safety lock trigger positioned near a top of the first pivotable trigger for controlling dispensing of the at least one polyol and at least one diisocyanate, the second pivotable safety lock trigger extending forward from a slot in a front face of the first pivotable trigger; a third pivotable trigger forward of the first pivotable trigger for controlling dispensing of the liquid or gas from the third input hose; and a high/low or on/off pivotable control within the gun, the control within a flow path within the gun and post ingress of either the input for the pair of upwardly canted hoses for the at least one polyol and the at least one diisocyanate or the third input hose, the high/low or on/off pivotable control independent of a position of the first trigger.

In still yet a further aspect of the invention, a removable module for a foam spray gun is described which comprises: a pair of male projections on a forward end of the module for mating engagement with a corresponding pair of female receptacles on the spray gun; a pair of female receptacles on a rearward end of the module for mating engagement with a pair of input hoses, each input hose for feeding one of at least one polyol and at least one diisocyanate under pressure of a propellant, each of the input hoses having at least one circumferentially raised rib and at least one adjacent circumferentially disposed slot at one end of each input hose; an opposed pair of apertures on each side of the module; one first pair of apertures for tangentially contacting each of the pair of input hoses by insertion of a first pin; one second pair of apertures aligned with a raised transverse channel on the spray gun, the transverse channel contained within the side walls of the module, for insertion of a second pin; and a transverse channel within or adjacent to the pair of male projections on the forward end of the module and in fluid communication with an input stream of the pair of input hoses; a cylinder positioned within the transverse channel, the cylinder having at least two opposed bores in longitudinal communication with the input stream of the pair of hoses when aligned, each of the at least two opposed bores having different sizes, the different sizes permitting higher and lower flow rates.

Additionally, the invention encompasses kits of the above, the kits including a spray gun and a package containing a plurality of color-changing nozzles.

These and other advantages and novel features of the claimed invention, as well as details of illustrated embodiments thereof, will be more fully understood from the following description and drawings.

DETAILED DESCRIPTION OF THE INVENTION

The best mode for carrying out the invention will now be described for the purposes of illustrating the best mode known to the applicant at the time of the filing of this application. The examples are illustrative only and not meant to limit the invention, as measured by the scope and spirit of the claims.

Figure 1:
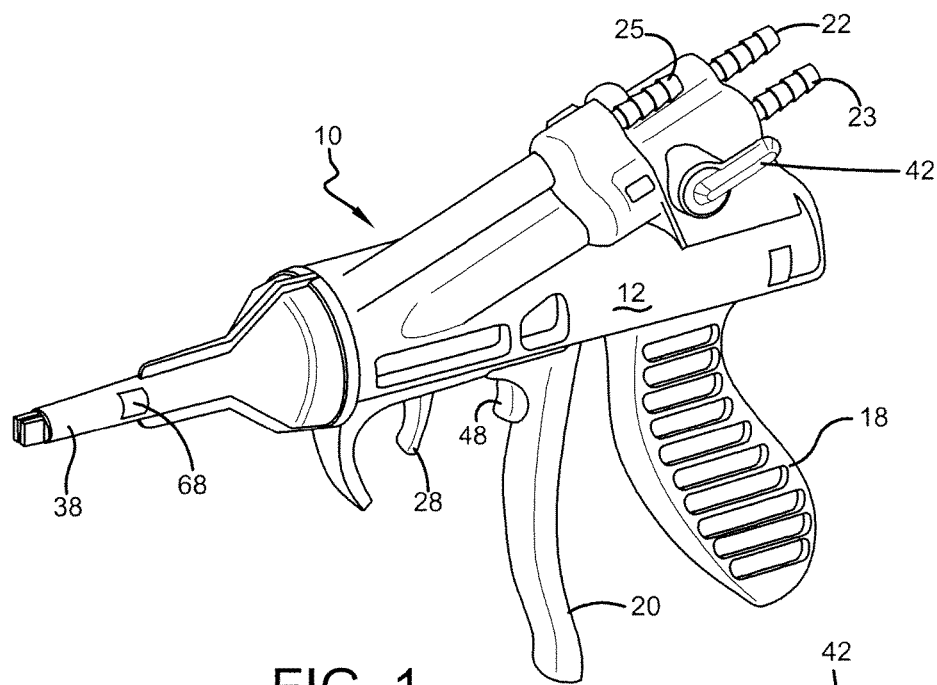
FIG. 1 illustrates a perspective view of the spray gun with a third stream trigger forward of the dispensing trigger.

As illustrated in FIG. 1, spray gun 10 has a pair of canting hose openings 22,23 in communication with removable nozzle 38 in operative communication with housing 12. Third hose opening 25 also communicates with removable nozzle 38. Safety lock 48 is pivotally positioned within dispensing trigger 20 which is positioned before rearward-sloping curvilinear handle 18. Safety lock 48 is accessed and controlled typically via index finger control by the user. In one aspect of the invention, "twist and click" nozzle 38 is a temperature sensitive nozzle in which the nozzle changes color depending upon the temperature of the dispensed chemicals, thereby permitting the user to visually see if the chemicals are being dispensed at the proper temperature, which at least in part, governs the applied A/B ratio. Alternatively, the temperature indicating nozzle may have a label affixed thereupon, the label containing a temperature sensitive color-changing dye or pigment. The label or the entire nozzle turns from a first application color (e.g., white) to a second too cold color (e.g., blue) depending on the temperature of the dispensed chemicals egressing through nozzle 38. Third stream trigger 28 is pivotally positioned in front of pivotable dispensing trigger 20 and governs the flow of the fluid (liquid or gas) within the channel of third hose 25. The dispensing gun is further provided with pivotal high/low or on/off output control lever 42 for further control by an operator and held in place via lock ring 46 on end 44. When used for high/low flow control, different diametered channels are bored into a transverse shaft of control lever 42.

Figure 2:
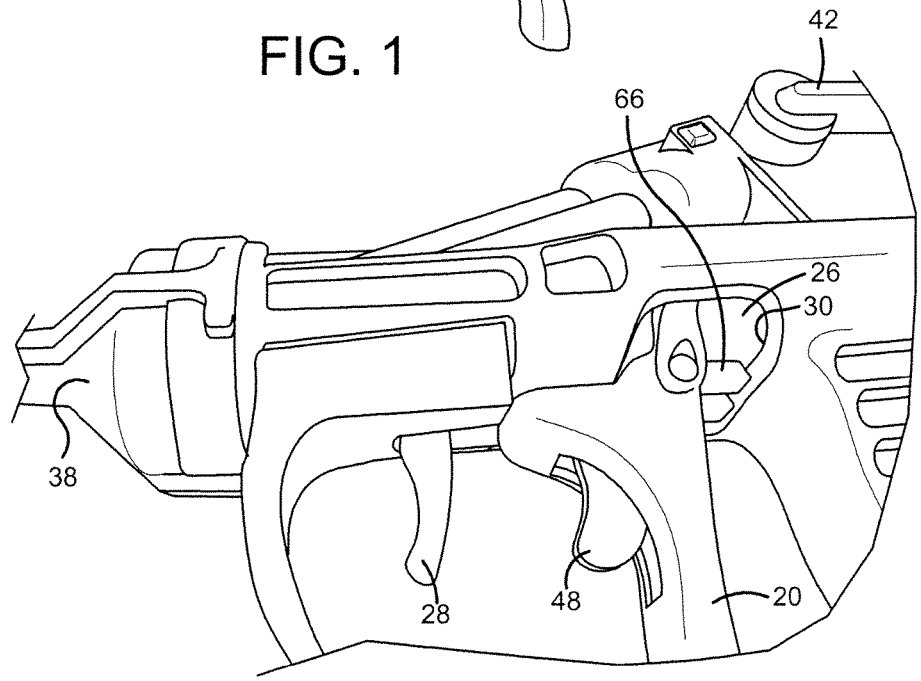
FIG. 2 illustrates a bottom perspective view of the spray gun illustrating the yoke of the safety trigger.

FIG. 2 illustrates yoke 66 of safety lock 48 positioned within dispensing trigger 20. As illustrated in the figure, safety lock is biased in a forward direction with yoke 66 impinging upon rear lip 30 of bottom housing opening 26. Depressing safety lock 48 pivotally elevates yoke 66 so as to permit rearward movement of pivotable dispensing trigger 20.

Figure 3:
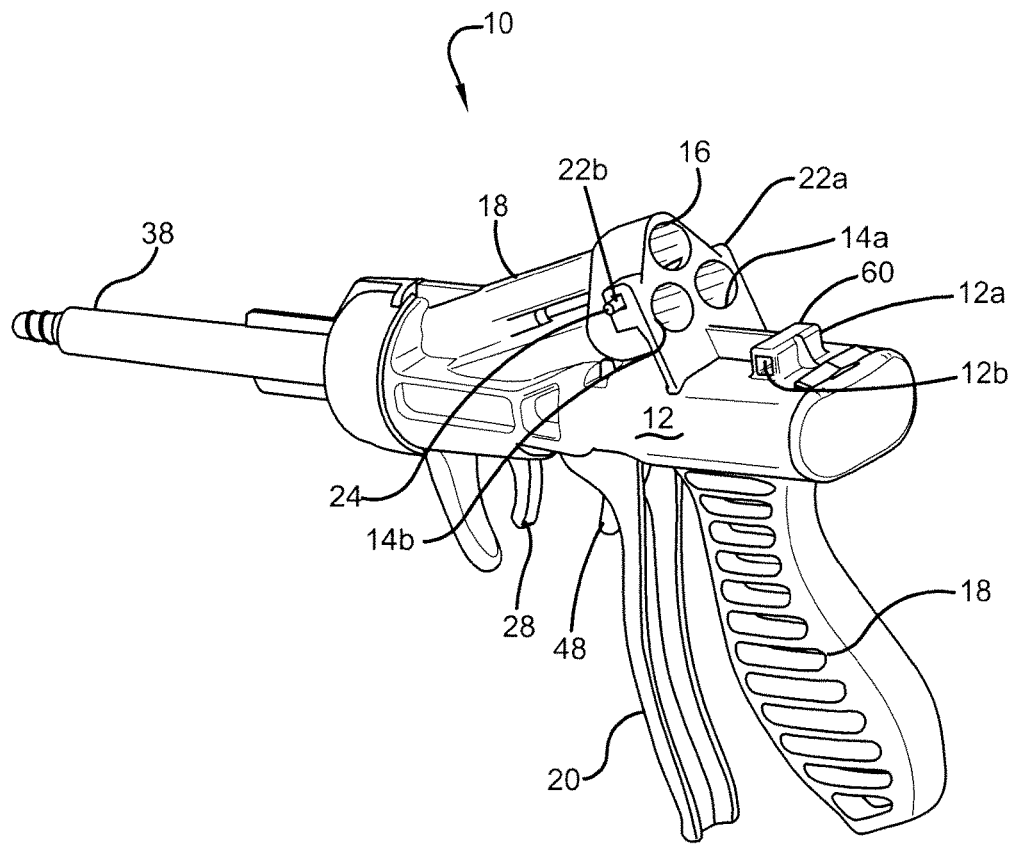
FIG. 3 illustrates a modular design of the spray gun with interface module removed.

FIG. 3 illustrates spray gun 10 with rear raised transverse channel 60 having opposed openings 12a,12b at each end of the channel. While the channel is depicted as rectangular, any geometric shape for the hollow channel is an option, including circular. The channel also need not be of a constant diameter, but may have a slightly smaller diameter at one opening so as to provide a friction fit for an inserted lock pin.

As shown, upper portion of housing 12 has a pair of upwardly canted female channel openings 14a, 14b for the "A" and "B" chemical streams, the specific channel opening associated with the "A" and/or "B" stream not being relevant, and third stream female channel opening 16 into which mating projections are inserted from removable module 30. Impinging tangentially and peripherally into third stream opening 16 is a transverse longitudinal channel having opposed openings 22a, 22b for insertion of third stream locking pin 24.

Figure 4:
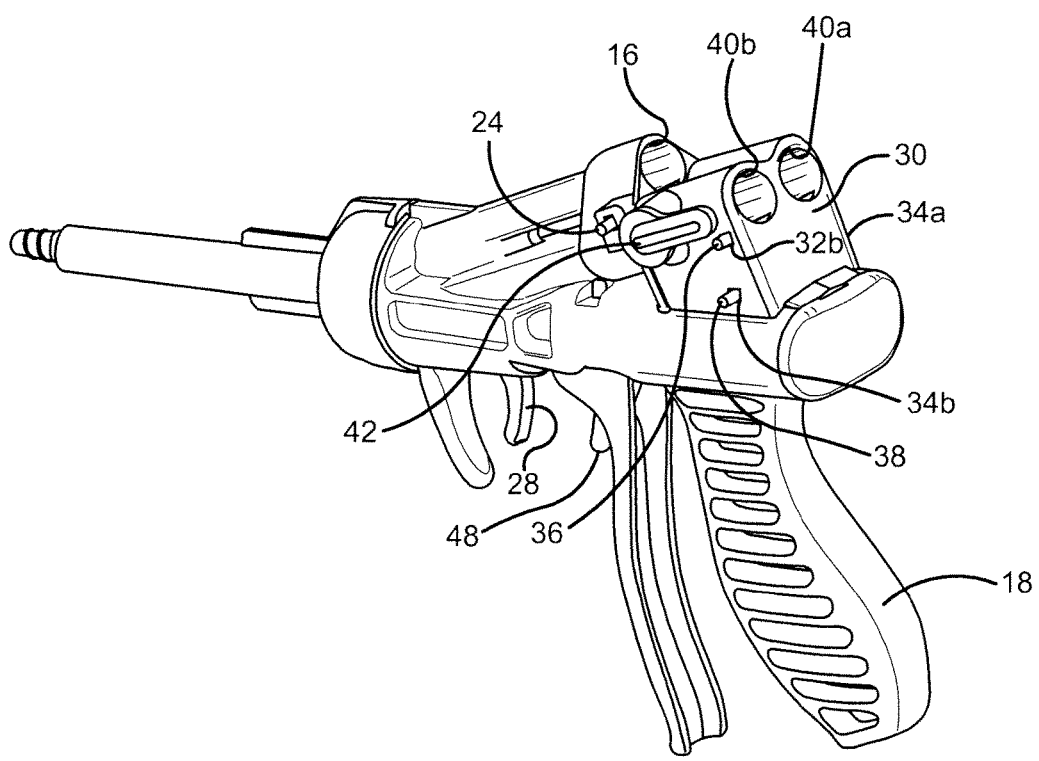
FIG. 4 illustrates the interface module inserted and securely fastened to the housing of the spray gun.

As better illustrated in FIG. 4, separable module 30 is shown in fluid communication with upwardly canted openings 14a, 14b and securely affixed to the rear of housing 12 by insertion of transverse pin 38 having opposed openings 34a, 34b, transverse pin 38 also positioned through transverse channel 60. In a manner similar to that described for third stream locking pin 24, also impinging tangentially and peripherally into "A" and "B" chemical stream openings 40a, 40b, is a transverse longitudinal channel having opposed openings 32a, 32b for insertion of "A/B" stream locking pin 36.

Figure 5:
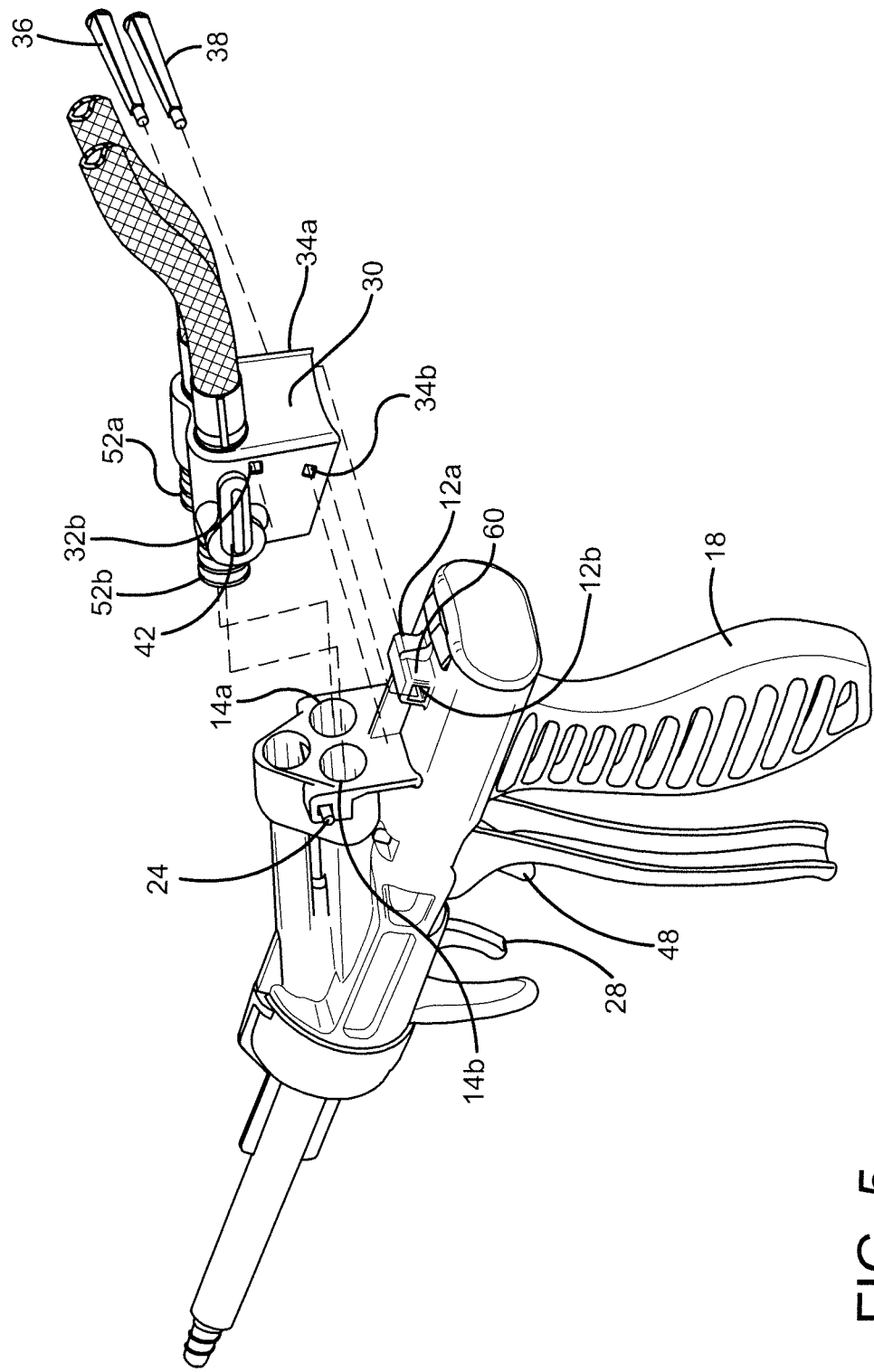
FIG. 5 illustrates the interface module as to be inserted onto the rear of the spray gun with tapered pin fasteners.
Figure 9:
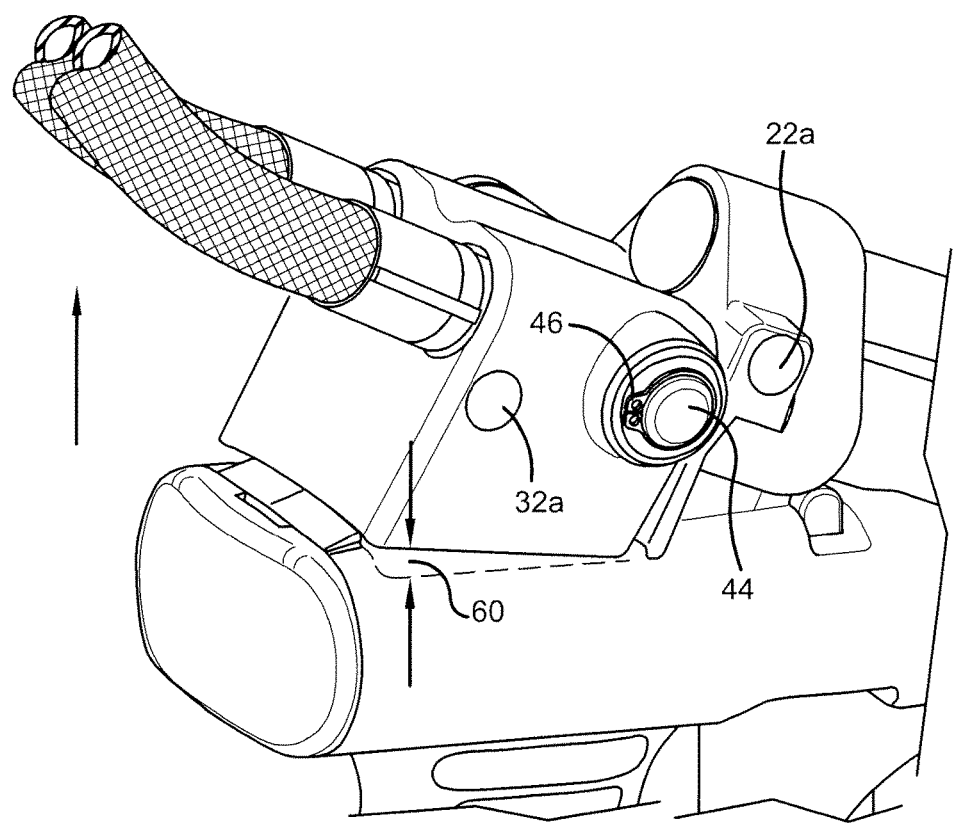
FIG. 9 illustrates the sliding vertical movement issue which manifests itself when no transverse rear bottom channel is present to fasten the interface module to the housing of the spray gun.

FIG. 5 illustrates the insertion of separable module 30 into upwardly canted female channel openings 14a,14b by mating engagement with male projections 52a, 52b respectively. These male projections typically have at least one, preferably two circumferential grooves with elastomeric or rubber O-rings positioned therein to minimize leakage. Transverse pin 38 secures module 30 onto housing 12 by insertion into aperture 34a, aperture 12a, transverse channel 60 with subsequent egress through aperture 12b as well as through aperture 34b. This locking mechanism for separable module 30 to gun housing 12 prevents the vertical movement 60 best illustrated in FIG. 9, when no transverse pin 38 was employed. Transverse pin 36 is also employed for securing engagement of the "A" and "B" hoses into the gun by tangential contacting engagement with a groove in the end of the hoses.

Figure 6:
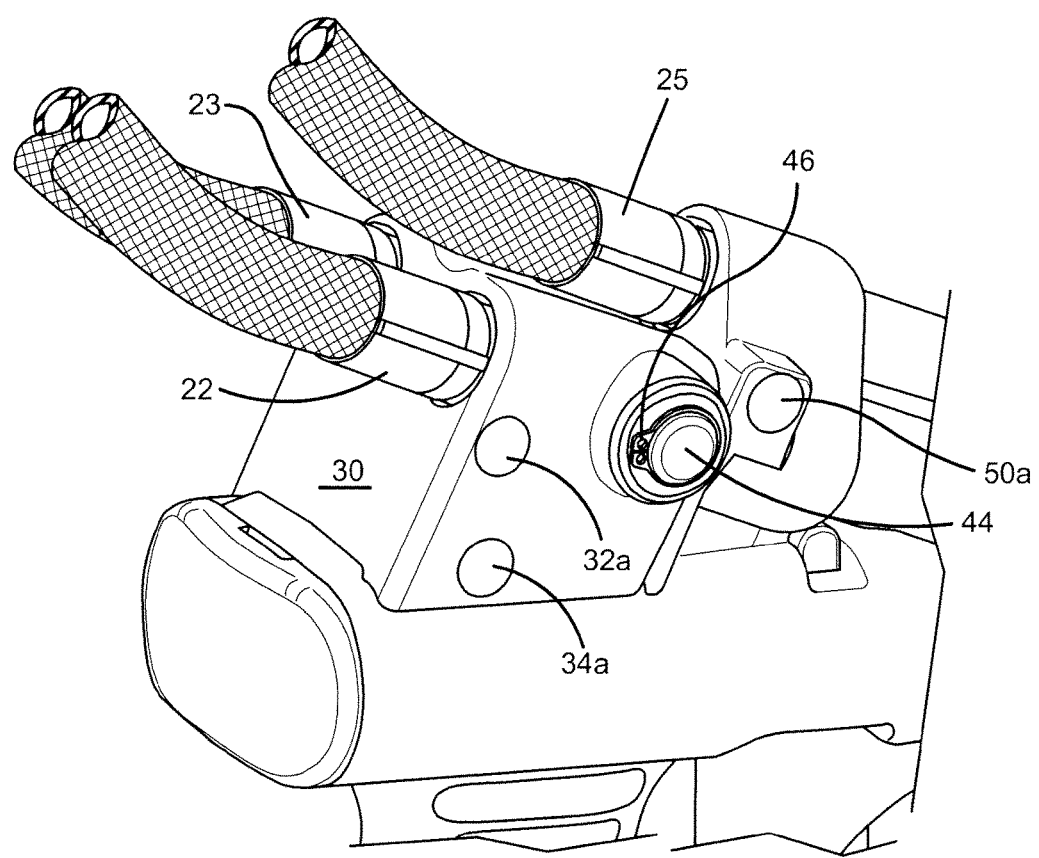
FIG. 6 illustrates arear perspective view of the interface module attached to the rear of the spray gun.

FIG. 6 is similar to FIG. 5 but further illustrates the mating engagement of a third stream hose 25 in leak-proof engagement with third stream female channel opening 16.

Figure 7:
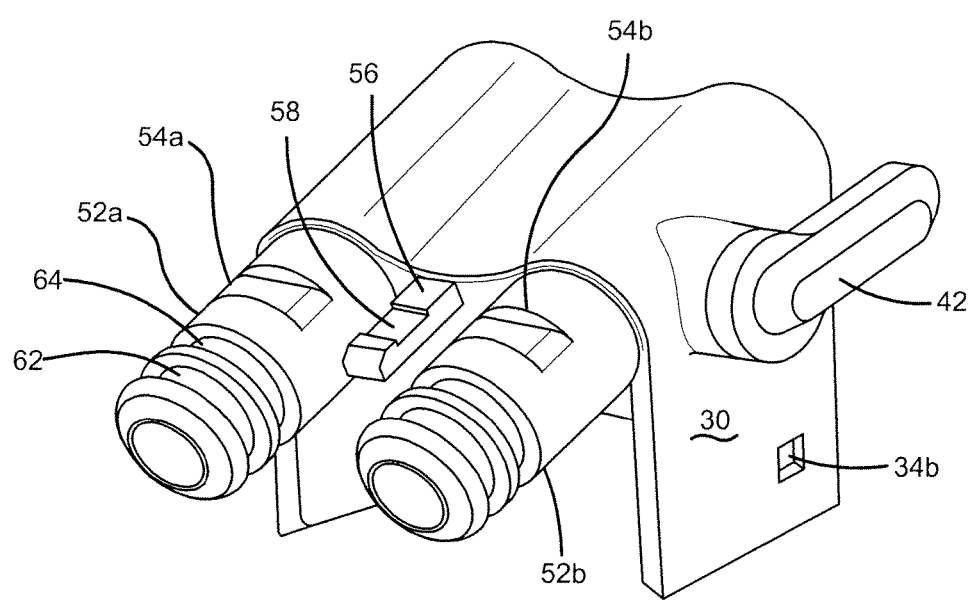
FIG. 7 illustrates a perspective view of the interface module with "A" and "B" projections.
Figure 8:
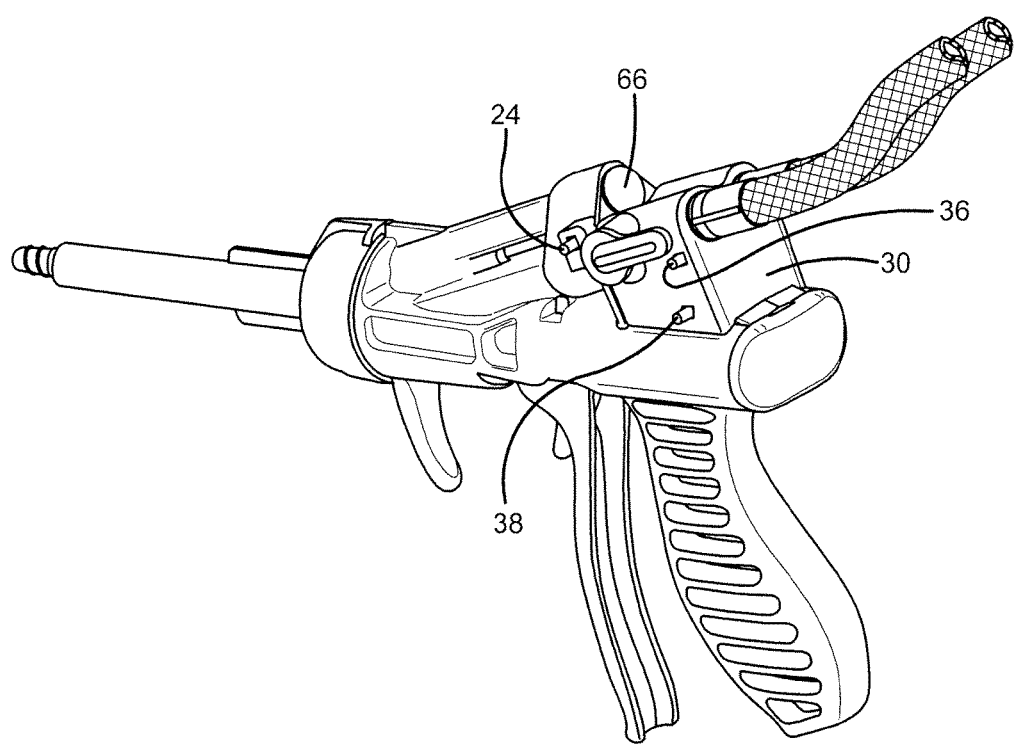
FIG. 8 illustrates rear perspective view of the spray gun with third stream opening plugged.

As better illustrated in FIG. 7, separable module 30 with male projections 52a, 52b is essentially hollow. Each of the male projections has at least one, preferably a pair of annular grooves 62, 64 for positioning of the O-rings therein for sealing engagement. Additionally, each male projection has a transverse groove 54a, 54b with optional tab 56 having a similar tab groove 58 for securing engagement of the separable module into upwardly canted female channel openings 14a, 14b via transverse third stream locking pin 24 through opposed openings 22a, 22b. While designed as a three-stream nozzle, it is also possible to employ the spray gun in a traditional two-stream manner as illustrated in FIG. 8 where the third stream is plugged with plug 66.

The color-changing aspects of the invention above, use thermochromism which is typically implemented via one of two common approaches: liquid crystals and leuco dyes. Liquid crystals are used in precision applications, as their responses can be engineered to accurate temperatures, but their color range is limited by their principle of operation. Leuco dyes allow wider range of colors to be used, but their response temperatures are more difficult to set with accuracy.

Some liquid crystals are capable of displaying different colors at different temperatures. This change is dependent on selective reflection of certain wavelengths by the crystalline structure of the material, as it changes between the low-temperature crystalline phase, through anisotropic chiral or twisted nematic phase, to the high-temperature isotropic liquid phase. Only the nematic mesophase has thermochromic properties. This restricts the effective temperature range of the material.

The twisted nematic phase has the molecules oriented in layers with regularly changing orientation, which gives them periodic spacing. The light passing through the crystal undergoes Bragg diffraction on these layers, and the wavelength with the greatest constructive interference is reflected back, which is perceived as a spectral color. A change in the crystal temperature can result in a change of spacing between the layers and therefore in the reflected wavelength. The color of the thermochromic liquid crystal can therefore continuously range from non-reflective (black) through the spectral colors to black again, depending on the temperature. Typically, the high temperature state will reflect blue-violet, while the low-temperature state will reflect red-orange. Since blue is a shorter wavelength than red, this indicates that the distance of layer spacing is reduced by heating through the liquid-crystal state.

Some such materials are cholesteryl nonanoate or cyanobiphenyls. Liquid crystals used in dyes and inks often come microencapsulated, in the form of suspension. Liquid crystals are used in applications where the color change has to be accurately defined.

Thermochromic dyes are based on mixtures of leuco dyes with suitable other chemicals, displaying a color change (usually between the colorless leuco form and the colored form) in dependence on temperature. The dyes are rarely applied on materials directly; they are usually in the form of microcapsules with the mixture sealed inside. An illustrative example would include microcapsules with crystal violet lactone, weak acid, and a dissociable salt dissolved in dodecanol; when the solvent is solid, the dye exists in its lactone leuco form, while when the solvent melts, the salt dissociates, the pH inside the microcapsule lowers, the dye becomes protonated, its lactone ring opens, and its absorption spectrum shifts drastically, therefore it becomes deeply violet. In this case the apparent thermochromism is in fact halochromism.

The dyes most commonly used are spirolactones, fluorans, spiropyrans, and fulgides. The weak acids include bisphenol A, parabens, 1,2,3-triazole derivates, and 4-hydroxycoumarin and act as proton donors, changing the dye molecule between its leuco form and its protonated colored form; stronger acids would make the change irreversible.

Leuco dyes have less accurate temperature response than liquid crystals. They are suitable for general indicators of approximate temperature. They are usually used in combination with some other pigment, producing a color change between the color of the base pigment and the color of the pigment combined with the color of the non-leuco form of the leuco dye. Organic leuco dyes are available for temperature ranges between about 23° F. (−5° C.) and about 140° F. (60° C.), in wide range of colors. The color change usually happens in about a 5.4° F. (3° C.) interval.

The size of the microcapsules typically ranges between 3-5 µm (over 10 times larger than regular pigment particles), which requires some adjustments to printing and manufacturing processes.

Thermochromic paints use liquid crystals or leuco dye technology. After absorbing a certain amount of light or heat, the crystalline or molecular structure of the pigment reversibly changes in such a way that it absorbs and emits light at a different wavelength than at lower temperatures.

The thermochromic dyes contained either within or affixed upon either the disposable nozzle or hoses may be configured to change the color of the composition in various ways. For example, in one embodiment, once the composition reaches a selected temperature, the composition may change from a base color to a white color or a clear color. In another embodiment, a pigment or dye that does not change color based on temperature may be present for providing a base color. The thermochromic dyes, on the other hand, can be included in order to change the composition from the base color to at least one other color.

In one particular embodiment, the plurality of thermochromic dyes are configured to cause the cleansing composition to change color over a temperature range of at least about 3° C., such as at least about 5° C., once the composition is heated to a selected temperature. For example, multiple thermochromic dyes may be present within the cleansing composition so that the dyes change color as the composition gradually increases in temperature. For instance, in one embodiment, a first thermochromic dye may be present that changes color at a temperature of from about 23° C. to about 28° C. and a second thermochromic dye may be present that changes color at a temperature of from about 27° C. to about 32° C. If desired, a third thermochromic dye may also be present that changes color at a temperature of from about 31° C. to about 36° C. In this manner, the cleansing composition changes color at the selected temperature and then continues to change color in a stepwise manner as the temperature of the composition continues to increase. It should be understood that the above temperature ranges are for exemplary and illustrative purposes only.

Any thermochromic substance that undergoes a color change at the desired temperature may generally be employed in the present disclosure. For example, liquid crystals may be employed as a thermochromic substance in some embodiments. The wavelength of light ("color") reflected by liquid crystals depends in part on the pitch of the helical structure of the liquid crystal molecules. Because the length of this pitch varies with temperature, the color of the liquid crystals is also a function of temperature. One particular type of liquid crystal that may be used in the present disclosure is a liquid crystal cholesterol derivative. Exemplary liquid crystal cholesterol derivatives may include alkanoic and aralkanoic acid esters of cholesterol, alkyl esters of cholesterol carbonate, cholesterol chloride, cholesterol bromide, cholesterol acetate, cholesterol oleate, cholesterol caprylate, cholesterol oleyl-carbonate, and so forth. Other suitable liquid crystal compositions are possible and contemplated within the scope of the invention.

In addition to liquid crystals, another suitable thermochromic substance that may be employed in the present disclosure is a composition that includes a proton accepting chromogen ("Lewis base") and a solvent. The melting point of the solvent controls the temperature at which the chromogen will change color. More specifically, at a temperature below the melting point of the solvent, the chromogen generally possesses a first color (e.g., red). When the solvent is heated to its melting temperature, the chromogen may become protonated or deprotonated, thereby resulting in a shift of the absorption maxima. The nature of the color change depends on a variety of factors, including the type of proton-accepting chromogen utilized and the presence of any additional temperature-insensitive chromogens. Regardless, the color change is typically reversible.

Although not required, the proton-accepting chromogen is typically an organic dye, such as a leuco dye. In solution, the protonated form of the leuco dye predominates at acidic pH levels (e.g., pH of about 4 or less). When the solution is made more alkaline through deprotonation, however, a color change occurs. Of course, the position of this equilibrium may be shifted with temperature when other components are present. Suitable and non-limiting examples of leuco dyes for use in the present disclosure may include, for instance, phthalides; phthalanes; substituted phthalides or phthalanes, such as triphenylmethane phthalides, triphenylmethanes, or diphenylmethanes; acyl-leucomethylene blue compounds; fluoranes; indolylphthalides, spiropyranes; cumarins; and so forth. Exemplary fluoranes include, for instance, 3,3'-dimethoxyfluorane, 3,6-dimethoxyfluorane, 3,6-di-butoxyfluorane, 3-chloro-6-phenylamino-flourane, 3-diethylamino-6-dimethylfluorane, 3-diethylamino-6-methyl-7-chlorofluorane, and 3-diethyl-7,8-benzofluorane, 3,3'-bis-(p-dimethyl-aminophenyl)-7-phenylaminofluorane, 3-diethylamino-6-methyl-7-phenylamino-fluorane, 3-diethylamino-7-phenyl-aminofluorane, and 2-anilino-3-methyl-6-diethylamino-fluorane. Likewise, exemplary phthalides include 3,3',3"-tris(p-dimethylamino-phenyl)phthalide, 3, 3'-bis(p-dimethyl-aminophenyl)phthalide, 3, 3-bis(p-diethylamino-phenyl)-6-dimethylamino-phthalide, 3-(4-diethylaminophenyl)-3-(1-ethyl-2-methylindol-3-yl)phthalide, and 3-(4-diethylamino-2-methyl)phenyl-3-(1,2-dimethylindol-3-yl)phthalide.

Although any solvent for the thermochromic dye may generally be employed in the present disclosure, it is typically desired that the solvent have a low volatility. For example, the solvent may have a boiling point of about 150° C. or higher, and in some embodiments, from about 170° C. to 280° C. Likewise, the melting temperature of the solvent is also typically from about 25° C. to about 40° C., and in some embodiments, from about 30° C. to about 37° C. Examples of suitable solvents may include saturated or unsaturated alcohols containing about 6 to 30 carbon atoms, such as octyl alcohol, dodecyl alcohol, lauryl alcohol, cetyl alcohol, myristyl alcohol, stearyl alcohol, behenyl alcohol, geraniol, etc.; esters of saturated or unsaturated alcohols containing about 6 to 30 carbon atoms, such as butyl stearate, methyl stearate, lauryl laurate, lauryl stearate, stearyl laurate, methyl myristate, decyl myristate, lauryl myristate, butyl stearate, lauryl palmitate, decyl palmitate, palmitic acid glyceride, etc.; azomethines, such as benzylideneaniline, benzylidenelaurylamide, o-methoxybenzylidene laurylamine, benzylidene p-toluidine, p-cumylbenzylidene, etc.; amides, such as acetamide, stearamide, etc.; and so forth.

The thermochromic composition may also include a proton-donating agent (also referred to as a "color developer") to facilitate the reversibility of the color change. Such proton-donating agents may include, for instance, phenols, azoles, organic acids, esters of organic acids, and salts of organic acids. Exemplary phenols may include phenylphenol, bisphenol A, cresol, resorcinol, chlorolucinol, b-naphthol, 1,5-dihydroxynaphthalene, pyrocatechol, pyrogallol, trimer of p-chlorophenol-formaldehyde condensate, etc. Exemplary azoles may include benzotriaoles, such as 5-chlorobenzotriazole, 4-laurylaminosulfobenzotriazole, 5-butylbenzotriazole, dibenzotriazole, 2-oxybenzotriazole, 5-ethoxycarbonylbenzotriazole, etc.; imidazoles, such as oxybenzimidazole, etc.; tetrazoles; and so forth. Exemplary organic acids may include aromatic carboxylic acids, such as salicylic acid, methylenebissalicylic acid, resorcylic acid, gallic acid, benzoic acid, p-oxybenzoic acid, pyromellitic acid, b-naphthoic acid, tannic acid, toluic acid, trimellitic acid, phthalic acid, terephthalic acid, anthranilic acid, etc.; aliphatic carboxylic acids, such as stearic acid, 1,2-hydroxystearic acid, tartaric acid, citric acid, oxalic acid, lauric acid, etc.; and so forth. Exemplary esters may include alkyl esters of aromatic carboxylic acids in which the alkyl moiety has 1 to 6 carbon atoms, such as butyl gallate, ethyl p-hydroxybenzoate, methyl salicylate, etc.

The amount of the proton-accepting chromogen employed may generally vary, but is typically from about 2 wt. % to about 20 wt. %, and in some embodiments, from about 5 to about 15 wt. % of the thermochromic substance. Likewise, the proton-donating agent may constitute from about 5 to about 40 wt. %, and in some embodiments, from about 10 wt. % to about 30 wt. % of the thermochromic substance. In addition, the solvent may constitute from about 50 wt. % to about 95 wt. %, and in some embodiments, from about 65 wt. % to about 85 wt. % of the thermochromic composition.

Regardless of the particular thermochromic substance employed, it may be microencapsulated to enhance the stability of the substance during processing. For example, the thermochromic substance may be mixed with a thermosetting resin according to any conventional method, such as interfacial polymerization, in-situ polymerization, etc. The thermosetting resin may include, for example, polyester resins, polyurethane resins, melamine resins, epoxy resins, diallyl phthalate resins, vinylester resins, and so forth. The resulting mixture may then be granulated and optionally coated with a hydrophilic macromolecular compound, such as alginic acid and salts thereof, carrageenan, pectin, gelatin and the like, semisynthetic macromolecular compounds such as methylcellulose, cationized starch, carboxymethylcellulose, carboxymethylated starch, vinyl polymers (e.g., polyvinyl alcohol), polyvinylpyrrolidone, polyacrylic acid, polyacrylamide, maleic acid copolymers, and so forth. The resulting thermochromic microcapsules typically have a size of from about 1 to about 50 micrometers, and in some embodiments, from about 3 to about 15 micrometers. Various other microencapsulation techniques may also be used.

Thermochromic dyes are commercially available from various sources. In one embodiment, for instance, thermochromic dyes marketed by Chromadic creations, Hamilton, Ontario and sold under the trade name SpectraBurst Thermochromic Polypropylene.

The thermochromic dyes can be present in the composition in an amount sufficient to have a visual effect on the color of the composition. The amount or concentration of the dyes can also be increased or decreased depending upon the desired intensity of any color. In general, the thermochromic dyes may be present in the composition in an amount from about 0.01% by weight to about 9% by weight, such as from about 0.1% by weight to about 3% by weight. For instance, in one particular embodiment, the thermochromic dyes may be present in an amount from about 0.3% to about 1.5% by weight.

As described above, thermochromic dyes typically change from a specific color to clear at a certain temperature, e.g., dark blue below 60° F. (15.6° C.) to transparent or translucent above 60° F. (15.6° C.). If desired, other pigments or dyes can be added to the composition in order to provide a background color that remains constant independent of the temperature of the composition. By adding other pigments or dyes in combination with the thermochromic dyes to the composition, the thermochromic dyes can provide a color change at certain temperatures rather than just a loss of color should the thermochromic dye become clear. For instance, a non-thermochromic pigment, such as a yellow pigment, may be used in conjunction with a plurality of thermochromic dyes, such as a red dye and a blue dye.

When all combined together, the cleansing composition may have a dark color. As the composition is increased in temperature, the red thermochromic dye may turn clear changing the color to a green shade (a combination of yellow and blue). As the temperature further increases, the blue thermochromic dye turns clear causing the composition to turn yellow.

It should be understood, that all different sorts of thermochromic dyes and non-thermochromic pigments and dyes may be combined in order to produce a composition having a desired base color and one that undergoes desired color changes. The color changes, for instance, can be somewhat dramatic and fanciful. For instance, in one embodiment, the composition may change from green to yellow to red.

In an alternative embodiment, however, the composition can contain different thermochromic dyes all having the same color. As the temperature of the composition is increased, however, the shade or intensity of the color can change. For instance, the composition can change from a vibrant blue to a light blue to a clear color.

In addition, it is surprising that the color-changing effect is capable of being visualized in the first instance, in that the sequence is that an aerosol (gas & liquid droplet mixture) of "A" and "B" reactants are formed upon entry from the hoses from the "A" and "B" cylinders, which upon contact begins the "frothing" process in the synthesis of a foam having the consistency of shaving cream. As is known in the industry, the final crosslinking process which gives the foam some rigidity, is effected after egress from the nozzle tip and upon exposure to moisture in the air as well as coming from typically the "B" cylinder as a reactant.

The heat transfer characteristics of an aerosol "froth" foam are not good. The "froth" would be in contact with the walls of the nozzle for a period of approximately 85-100 milliseconds at a typical flow rate of 50 g/sec. in that most two-component spray systems use 150-250 psi pressure in the hoses which results in the above nozzle residence time. The very short contact time coupled with the large amount of "void" space, which is inherent in the definition of a "froth foam" makes it quite surprising that any type of indication of temperature is possible in the nozzle of a spray foam gun. It is counter-intuitive to believe that any indication of temperature is possible under these conditions. This is all the more remarkable in that foam is used as insulation, and for that very reason, its heat transfer characteristics are not good.

In addition to the above, it should be understood that many alterations and permutations are possible. Any of a variety of colors and shades can be mixed in order to undergo color changes as a function of temperature.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A foam spray gun which comprises:
   a housing having at least a pair of female housing receptacles for receiving at least a pair of mating male housing protrusions extending from an insertable and detachable module;
   the housing having a front and a rear side and an upper and lower surface;
   the housing further having a raised transverse hollow channel toward a rear upper surface of the housing;
   the separable module having at least a pair of female module receptacles for receiving at least a pair of input hoses, each input hose for feeding one of at least one polyol and at least one diisocyanate under pressure of a propellant, each of the input hoses having at least one circumferentially raised rib and at least one adjacent circumferentially disposed slot at one end of each input hose;
   the separable module having two pairs of opposed apertures on each side of the module;
   one first pair of apertures aligned with the transverse rear channel;
   a first pin inserted into the first pair of apertures and transverse rear channel;
   one second pair of apertures aligned to tangentially contact the circumferentially disposed slot of each input hose;
   a second pin inserted into the second pair of apertures, the second pin tangentially contacting the circumferential slot on each input hose;
   a removable nozzle affixed to the front of the housing; and
   at least a first pivotable trigger for controlling dispensing of said at least one polyol and said at least one diisocyanate in said pair of input hoses, said trigger adjacent a handle.

2. The foam spray gun of claim 1, wherein the housing further comprises:
   a third female receptacle for receiving a third input hose for dispensing a liquid or a gas, the third female receptacle positioned above the pair input hoses for the at least one polyol and at least one diisocyanate.

3. The foam spray gun of claim 2, wherein
   the third input hose has at least one circumferentially raised rib and at least one adjacent circumferentially disposed slot at one end of the third input hose,
   the housing further having a third pair of opposed apertures aligned to tangentially contact the circumferentially disposed slot of the third input hose; and
   a third pin inserted into the third pair of apertures, the third pin tangentially contacting the circumferential slot of the third input hose.

4. The foam spray gun of claim 1 which further comprises:
   a second pivotable safety lock biased in a locked position, said second pivotable safety lock extending forward from a front face of said first pivotable trigger for controlling dispensing of said at least one polyol and said at least one diisocyanate.

5. The foam spray gun of claim 3 which further comprises:
   a third pivotable trigger forward of said first pivotable trigger for controlling dispensing of said liquid or gas from said third input hose.

6. The foam spray gun of claim 1, wherein
   said removable nozzle is temperature sensitive changing from a first color to a second color upon a temperature change within said nozzle.

7. The foam spray gun of claim 1, wherein said removable nozzle further comprises:
a temperature sensitive tape positioned on said nozzle, said pressure sensitive tape being temperature sensitive changing from a first color to a second color upon a temperature change within said nozzle.

8. The foam spray gun of claim 1, wherein
at least one of said pair of hoses has a temperature sensitive tape positioned thereupon, said temperature sensitive tape being temperature sensitive changing from a first color to a second color upon a temperature change within said hose.

9. The foam spray gun of claim 1, wherein
said nozzle is affixed to the front of said housing by rotational movement.

10. The foam spray gun of claim 1, which further comprises:
a high/low or on/off pivotable control within said separable module, said control within a flow path within said gun and post ingress of said at least one polyol and said at least one diisocyanate and independent of a position of the first trigger.

11. A foam spray gun which comprises:
a housing having at least a pair of female housing receptacles for receiving at least a pair of mating male housing protrusions extending from an insertable and detachable module;
the housing having a front and a rear side and an upper and lower surface;
the housing further having a raised transverse hollow channel toward a rear upper surface of the housing;
the separable module having at least a pair of female module receptacles for receiving at least a pair of input hoses, each input hose for feeding one of at least one polyol and at least one diisocyanate under pressure of a propellant, each of the input hoses having at least one circumferentially raised rib and at least one adjacent circumferentially disposed slot at one end of each input hose;
the separable module having two pairs of opposed apertures on each side of the module;
one first pair of apertures aligned with the transverse rear channel;
a first pin inserted into the first pair of apertures and transverse rear channel;
one second pair of apertures aligned to tangentially contact the circumferentially disposed slot of each input hose;
a second pin inserted into the second pair of apertures, the second pin tangentially contacting the circumferential slot on each input hose;
a removable nozzle affixed to the front of the housing; and
a first pivotable trigger for controlling dispensing of said at least one polyol and said at least one diisocyanate in said pair of input hoses, said trigger adjacent a handle;
a second pivotable safety lock trigger biased in a locked position, said second pivotable safety lock trigger extending forward from a front face of said first pivotable trigger for controlling dispensing of said at least one polyol and said at least one diisocyanate;
a high/low pivotable control within said separable module, said control within a flow path within said separable module and post ingress of said at least one polyol and said at least one diisocyanate and independent of a position of the first trigger.

12. The foam spray gun of claim 11, wherein the housing further comprises:
a third female receptacle for receiving a third input hose for dispensing a liquid or a gas and positioned above the pair input hoses for the at least one polyol and at least one diisocyanate.

13. The foam spray gun of claim 12, wherein
the third input hose has at least one circumferentially raised rib and at least one adjacent circumferentially disposed slot at one end of the third input hose,
the housing having a third pair of opposed apertures aligned to tangentially contact the circumferentially disposed slot of the third input hose; and
a third pin inserted into the third pair of apertures, the third pin tangentially contacting the circumferential slot of the third input hose.

14. The foam spray gun of claim 13 which further comprises:
a third pivotable trigger forward of said first pivotable trigger for controlling dispensing of said liquid or gas from said third input hose.

15. The foam spray gun of claim 11, wherein
said removable nozzle is temperature sensitive changing from a first color to a second color upon a temperature change within said nozzle.

16. The foam spray gun of claim 11, wherein said removable nozzle further comprises:
a temperature sensitive tape positioned on said nozzle, said pressure sensitive tape being temperature sensitive changing from a first color to a second color upon a temperature change within said nozzle.

17. The foam spray gun of claim 13, wherein
at least one of said pair of hoses has a temperature sensitive tape positioned thereupon, said pressure sensitive tape being temperature sensitive changing from a first color to a second color upon a temperature change within said hose.

18. The foam spray gun of claim 11, wherein
said nozzle is affixed to the front of said housing by rotational movement about a longitudinal axis.

19. A foam spray gun which comprises:
a housing having at least a pair of female housing receptacles for receiving at least a pair of mating male housing protrusions extending from an insertable and detachable module;
the housing having a front and a rear side and an upper and lower surface;
the housing further having a raised transverse hollow channel toward a rear upper surface of the housing;
the separable module having at least a pair of female module receptacles for receiving at least a pair of upwardly canted input hoses, each input hose for feeding one of at least one polyol and at least one diisocyanate under pressure of a propellant, each of the input hoses having at least one circumferentially raised rib and at least one adjacent circumferentially disposed slot at one end of each input hose;
the separable module having two pairs of opposed apertures on each side of the module;
one first pair of apertures aligned with the transverse rear channel;
a first pin inserted into the first pair of apertures and transverse rear channel;
one second pair of apertures aligned to tangentially contact the circumferentially disposed slot of each input hose;
a second pin inserted into the second pair of apertures, the second pin tangentially contacting the circumferential slot on each input hose;

a pressurized gas propellant for said at least one polyol and said at least one diisocyanate;
a temperature displaying removable nozzle affixable to a front of the housing, the nozzle changing from a first color to a second color upon a temperature change within the nozzle;
the removable nozzle comprising a static mixer for mixing an aerosol of said at least one polyol and said at least one diisocyanate;
an upwardly canted third input hose in communication with said removable nozzle for dispensing a liquid or a gas and positioned above the pair of upwardly canted input hoses for the at least one polyol and at least one diisocyanate;
a first pivotable trigger for controlling dispensing of said at least one polyol and said at least one diisocyanate in said pair of input hoses, said trigger adjacent a handle;
a second pivotable safety lock trigger positioned near a top of the first pivotable trigger for controlling dispensing of the at least one polyol and at least one diisocyanate, the second pivotable safety lock trigger extending forward from a slot in a front face of said first pivotable trigger;
a third pivotable trigger forward of said first pivotable trigger for controlling dispensing of said liquid or gas from said third input hose; and
a high/low or on/off pivotable control within said gun, said control within a flow path within said gun and post ingress of either
said input for said pair of upwardly canted hoses for said at least one polyol and said at least one diisocyanate or said third input hose,
said high/low or on/off pivotable control independent of a position of the first trigger.

20. A removable module for a foam spray gun which comprises:
a pair of male projections on a forward end of the module for mating engagement with a corresponding pair of female receptacles on the spray gun;
a pair of female receptacles on a rearward end of the module for mating engagement with a pair of input hoses, each input hose for feeding one of at least one polyol and at least one diisocyanate under pressure of a propellant, each of the input hoses having at least one circumferentially raised rib and at least one adjacent circumferentially disposed slot at one end of each input hose;
an opposed pair of apertures on each side of the module;
one first pair of apertures for tangentially contacting each of the pair of input hoses by insertion of a first pin;
one second pair of apertures aligned with a raised transverse channel on the spray gun, the transverse channel contained within the side walls of the module, for insertion of a second pin; and
a transverse channel within or adjacent to the pair of male projections on the forward end of the module and in fluid communication with an input stream of the pair of input hoses;
a cylinder positioned within the transverse channel, the cylinder having at least two opposed bores in longitudinal communication with the input stream of the pair of hoses when aligned, each of the at least two opposed bores having different sizes, the different sizes permitting higher and lower flow rates.

21. A foam spray gun kit which comprises:
a foam spray gun, said foam spray gun comprising;
a housing having at least a pair of female housing receptacles for receiving at least a pair of mating male housing protrusions extending from an insertable and detachable module;
the housing having a front and a rear side and an upper and lower surface;
the housing further having a raised transverse hollow channel toward a rear upper surface of the housing;
at least one separable module having at least a pair of female module receptacles for receiving at least a pair of input hoses, each input hose for feeding one of at least one polyol and at least one diisocyanate under pressure of a propellant, each of the input hoses having at least one circumferentially raised rib and at least one adjacent circumferentially disposed slot at one end of each input hose;
the separable module having two pairs of opposed apertures on each side of the module;
one first pair of apertures aligned with the transverse rear channel;
a first pin inserted into the first pair of apertures and transverse rear channel;
one second pair of apertures aligned to tangentially contact the circumferentially disposed slot of each input hose;
a second pin inserted into the second pair of apertures, the second pin tangentially contacting the circumferential slot on each input hose;
at least a first pivotable trigger for controlling dispensing of said at least one polyol and said at least one diisocyanate in said pair of input hoses, said trigger adjacent a handle; and
a package of color-changing removable nozzles for affixing onto a front of the spray gun.

22. A foam spray gun kit which comprises:
a foam spray gun, said foam spray gun comprising;
a housing having at least a pair of female housing receptacles for receiving at least a pair of mating male housing protrusions extending from an insertable and detachable module;
the housing having a front and a rear side and an upper and lower surface;
the housing further having a raised transverse hollow channel toward a rear upper surface of the housing;
at least one separable module having at least a pair of female module receptacles for receiving at least a pair of input hoses, each input hose for feeding one of at least one polyol and at least one diisocyanate under pressure of a propellant, each of the input hoses having at least one circumferentially raised rib and at least one adjacent circumferentially disposed slot at one end of each input hose;
the separable module having two pairs of opposed apertures on each side of the module;
one first pair of apertures aligned with the transverse rear channel;
a first pin inserted into the first pair of apertures and transverse rear channel;
one second pair of apertures aligned to tangentially contact the circumferentially disposed slot of each input hose;

a second pin inserted into the second pair of apertures, the second pin tangentially contacting the circumferential slot on each input hose;

a first pivotable trigger for controlling dispensing of said at least one polyol and said at least one diisocyanate in said pair of input hoses, said trigger adjacent a handle;

a second pivotable safety lock trigger biased in a locked position, said second pivotable safety lock trigger extending forward from a front face of said first pivotable trigger for controlling dispensing of said at least one polyol and said at least one diisocyanate;

a high/low pivotable control within said separable module, said control within a flow path within said separable module and post ingress of said at least one polyol and said at least one diisocyanate and independent of a position of the first trigger; and a package of color-changing removable nozzles for affixing onto a front of the spray gun.

23. A foam spray gun kit which comprises:

a foam spray gun, said foam spray gun comprising;

a housing having at least a pair of female housing receptacles for receiving at least a pair of mating male housing protrusions extending from an insertable and detachable module;

the housing having a front and a rear side and an upper and lower surface;

the housing further having a raised transverse hollow channel toward a rear upper surface of the housing;

at least one separable module having at least a pair of female module receptacles for receiving at least a pair of upwardly canted input hoses, each input hose for feeding one of at least one polyol and at least one diisocyanate under pressure of a propellant, each of the input hoses having at least one circumferentially raised rib and at least one adjacent circumferentially disposed slot at one end of each input hose;

the separable module having two pairs of opposed apertures on each side of the module;

one first pair of apertures aligned with the transverse rear channel;

a first pin inserted into the first pair of apertures and transverse rear channel;

one second pair of apertures aligned to tangentially contact the circumferentially disposed slot of each input hose;

a second pin inserted into the second pair of apertures, the second pin tangentially contacting the circumferential slot on each input hose;

a pressurized gas propellant for said at least one polyol and said at least one diisocyanate;

an upwardly canted third input hose in communication with said removable nozzle for dispensing a liquid or a gas and positioned above the pair of upwardly canted input hoses for the at least one polyol and at least one diisocyanate;

a first pivotable trigger for controlling dispensing of said at least one polyol and said at least one diisocyanate in said pair of input hoses, said trigger adjacent a handle;

a second pivotable safety lock trigger positioned near a top of the first pivotable trigger for controlling dispensing of the at least one polyol and at least one diisocyanate, the second pivotable safety lock trigger extending forward from a slot in a front face of said first pivotable trigger;

a third pivotable trigger forward of said first pivotable trigger for controlling dispensing of said liquid or gas from said third input hose; and a high/low or on/off pivotable control within said gun, said control within a flow path within said gun and post ingress of either said input for said pair of upwardly canted hoses for said at least one polyol and said at least one diisocyanate or said third input hose, said high/low or on/off pivotable control independent of a position of the first trigger; and a package of color-changing removable nozzles for affixing onto a front of the spray gun, the nozzle changing from a first color to a second color upon a temperature change within the nozzle, the removable nozzles comprising a static mixer for mixing an aerosol of said at least one polyol and said at least one diisocyanate.

* * * * *